(12) United States Patent
Terra et al.

(10) Patent No.: US 11,132,612 B2
(45) Date of Patent: Sep. 28, 2021

(54) EVENT RECOMMENDATION SYSTEM

(71) Applicant: Oracle International Corporation, Redwood Shores, CA (US)

(72) Inventors: Egidio Loch Terra, San Mateo, CA (US); James Thomas McKendree, Elizabeth, CO (US); Boonchanh Oupaxay, Mountain House, CA (US); Paz Centeno, Delray Beach, FL (US); Catherine H. M. Kuo, Danville, CA (US); Richard Lee Krenek, Pleasanton, CA (US); David Anthony Madril, Denver, CO (US); Gary Paul Allen, Petaluma, CA (US); Susan Jane Beidler, Oakland, CA (US)

(73) Assignee: Oracle International Corporation, Redwood Shores, CA (US)

( * ) Notice: Subject to any disclaimer, the term of this patent is extended or adjusted under 35 U.S.C. 154(b) by 826 days.

(21) Appl. No.: 15/933,300

(22) Filed: Mar. 22, 2018

(65) Prior Publication Data
US 2019/0102687 A1   Apr. 4, 2019

Related U.S. Application Data

(60) Provisional application No. 62/566,394, filed on Sep. 30, 2017, provisional application No. 62/566,405, filed on Sep. 30, 2017.

(51) Int. Cl.
*G06N 5/04*     (2006.01)
*G06N 20/00*    (2019.01)
(Continued)

(52) U.S. Cl.
CPC ............. *G06N 5/04* (2013.01); *G06F 3/0486* (2013.01); *G06N 20/00* (2019.01);
(Continued)

(58) Field of Classification Search
None
See application file for complete search history.

(56) References Cited

U.S. PATENT DOCUMENTS

| 5,727,950 A | 3/1998 | Cook et al. |
| 6,347,333 B2 | 2/2002 | Eisendrath et al. |
| (Continued) | | |

FOREIGN PATENT DOCUMENTS

| WO | 97/44766 A1 | 11/1997 |
| WO | 01/82150 A2 | 11/2001 |
| (Continued) | | |

OTHER PUBLICATIONS

Wang, Enhanced Group Recommender System and Visualization, Doctoral Thesis, University of Technology Sydney, 2016, pp. 1-190 (Year: 2016).*

(Continued)

*Primary Examiner* — Wilbert L Starks
(74) *Attorney, Agent, or Firm* — Invoke

(57) ABSTRACT

An event recommendation system recommends events for a candidate attendee. The system recommends an event based on characteristics of the candidate attendee and characteristics of prior attendees that attended a prior occurrence of the event. A prior attendee may have a positive or negative experience with the prior occurrence of the event. A positive experience may be defined, for example, as enjoying the event, completing the event, or performing well in the event. A negative experience may be defined, for example, as not enjoying the event, not completing the event, or not performing well in the event. An event is recommended to a candidate attendee if the candidate attendee has similar characteristics to a prior attendee that had a positive experience. An event is not recommended to a candidate attendee (Continued)

if the candidate attendee has similar characteristics as a prior attendee that had a negative experience.

20 Claims, 10 Drawing Sheets

(51) Int. Cl.
| | | |
|---|---|---|
| G06Q 50/20 | (2012.01) | |
| G06Q 30/02 | (2012.01) | |
| G06F 3/0486 | (2013.01) | |
| G06Q 10/10 | (2012.01) | |
| G06F 40/186 | (2020.01) | |

(52) U.S. Cl.
CPC ..... *G06Q 10/1095* (2013.01); *G06Q 30/0201* (2013.01); *G06Q 50/205* (2013.01); *G06F 40/186* (2020.01)

(56) References Cited

U.S. PATENT DOCUMENTS

| | | | |
|---|---|---|---|
| 6,427,063 | B1 | 7/2002 | Cook et al. |
| 7,882,041 | B2 | 2/2011 | Gibbons et al. |
| 8,412,736 | B1 | 4/2013 | Arnold et al. |
| 8,620,831 | B1 | 12/2013 | Adams |
| 8,764,454 | B1 | 7/2014 | Turner |
| 9,299,266 | B2 | 3/2016 | Crawford et al. |
| 9,824,603 | B2 | 11/2017 | Brooke et al. |
| 9,940,606 | B2 | 4/2018 | Madhavan et al. |
| 10,229,100 | B1 | 3/2019 | Lesner et al. |
| 10,607,298 | B1 | 3/2020 | Hanekamp et al. |
| 2004/0009462 | A1 | 1/2004 | McElwrath |
| 2004/0138913 | A1 | 7/2004 | Guerra |
| 2004/0161728 | A1 | 8/2004 | Benevento et al. |
| 2004/0167786 | A1 | 8/2004 | Grace |
| 2004/0181749 | A1 | 9/2004 | Chellapilla et al. |
| 2005/0198563 | A1 | 9/2005 | Kristjansson |
| 2006/0069576 | A1 | 3/2006 | Waldorf et al. |
| 2006/0252021 | A1 | 11/2006 | Watkins et al. |
| 2006/0265258 | A1 | 11/2006 | Powell et al. |
| 2009/0035733 | A1 | 2/2009 | Meitar et al. |
| 2009/0081629 | A1 | 3/2009 | Billmyer et al. |
| 2009/0083638 | A1 | 3/2009 | Gupta |
| 2009/0197234 | A1 | 8/2009 | Creamer et al. |
| 2010/0009330 | A1 | 1/2010 | Yaskin |
| 2010/0009331 | A1 | 1/2010 | Yaskin et al. |
| 2010/0009332 | A1 | 1/2010 | Yaskin et al. |
| 2010/0159438 | A1 | 6/2010 | German et al. |
| 2010/0223194 | A1 | 9/2010 | Adams |
| 2011/0270684 | A1 | 11/2011 | Holtzman |
| 2012/0233083 | A1 | 9/2012 | Strodtman et al. |
| 2012/0233084 | A1 | 9/2012 | Sardonis et al. |
| 2012/0233108 | A1 | 9/2012 | Stober et al. |
| 2013/0011821 | A1 | 1/2013 | Denley |
| 2014/0052663 | A1 | 2/2014 | Kelley et al. |
| 2014/0074896 | A1 | 3/2014 | Bushman et al. |
| 2014/0188442 | A1 | 7/2014 | Zelenka et al. |
| 2014/0195549 | A1 | 7/2014 | Ahn et al. |
| 2014/0205987 | A1 | 7/2014 | Habermehl et al. |
| 2014/0279620 | A1 | 9/2014 | Lillquist et al. |
| 2014/0379602 | A1 | 12/2014 | Nelson et al. |
| 2015/0066559 | A1 | 3/2015 | Brouwer |
| 2015/0134556 | A1 | 5/2015 | Spinner et al. |
| 2015/0149379 | A1 | 5/2015 | Dearmon |
| 2015/0149380 | A1 | 5/2015 | Kulkarni et al. |
| 2015/0205777 | A1 | 7/2015 | Campanelli et al. |
| 2015/0220880 | A1 | 8/2015 | Maipady et al. |
| 2015/0248739 | A1 | 9/2015 | Schulman et al. |
| 2015/0317604 | A1 | 11/2015 | Bubna et al. |
| 2016/0071424 | A1 | 3/2016 | Harney et al. |
| 2016/0085754 | A1 | 3/2016 | Gifford et al. |
| 2016/0140679 | A1 | 5/2016 | Segal et al. |
| 2016/0275634 | A1 | 9/2016 | Singh et al. |
| 2016/0371805 | A1 | 12/2016 | Knotts et al. |
| 2017/0004453 | A1 | 1/2017 | Lin et al. |
| 2017/0154308 | A1 | 6/2017 | Duerr et al. |
| 2017/0256172 | A1 | 9/2017 | Kil et al. |
| 2017/0316528 | A1 | 11/2017 | Willcox et al. |
| 2017/0365023 | A1 | 12/2017 | Cox et al. |
| 2018/0052919 | A1 | 2/2018 | Feldman |
| 2018/0130155 | A1 | 5/2018 | Oni et al. |
| 2018/0189911 | A1 | 7/2018 | Al-Sulaiman et al. |
| 2018/0276205 | A1 | 9/2018 | Auger |
| 2018/0293679 | A1 | 10/2018 | Bai et al. |
| 2018/0293905 | A1 | 10/2018 | Benz |
| 2018/0350016 | A1 | 12/2018 | Ward |
| 2018/0366021 | A1 | 12/2018 | Zertuche |
| 2019/0080628 | A1 | 3/2019 | Olsen |

FOREIGN PATENT DOCUMENTS

| | | |
|---|---|---|
| WO | 2003/100560 A2 | 12/2003 |
| WO | 2004/023329 A1 | 3/2004 |
| WO | 2013/066868 A1 | 5/2013 |

OTHER PUBLICATIONS

Burke, Hybrid Recommender Systems: Survey and Experiments User Modeling and User-Adapted Interaction, 2002, pp. 1-30 (Year: 2002).*

Herzog, Spontaneous Event Recommendations on the Go, DMRS, 2015, pp. 1-4 (Year: 2015).*

De Pessemier, Social Recommendations for Events, Ghent University, 2013, pp. 1-4 (Year: 2013).*

Maryalene LaPonsie, "The High School Student's Guide College Admissions", retrieved from https://web.archive.org/web/20161013154233/https://www.accreditedschoolsonline.org/resources/college-admissions-guide/; www.accreditedschoolsonline.org (Year: 2016).

Tsai et al., "Ontology-Mediated Integration of Intranet Web Services," Computer, p. 63-71, copyright 2003 IEEE (Year: 2003).

Aher, Sunita B., and L M. R. J. Lobo. "Combination of machine learning algorithms for recommendation of courses in E-Learning System based on historical data." Knowledge-Based Systems 51 (2013): 1-14. (Year: 2013).

Brzozowski, Mike, etal. "groupTime: preference based group scheduling." Proceedings of the SIGCHI conference on Human Factors in computing systems. 2006. (Year: 2006).

Liao, Soohyun Nam, et al. "A robust machine learning technique to predict low-performing students." ACM Transactions on Computing Education (TOCE) 19.3 (2019): 1-19. (Year: 2019).

Wang, Yen-Zen. "Using genetic algorithm methods to solve course scheduling problems." Expert Systems with Applications 25.1 (2003): 39-50. (Year: 2003).

Aguiar, E., Identifying students at risk and beyond: A machine learning approach (Order No. 3733723). Available from ProQuest Dissertations and Theses Professional. (1749024112), Jul. 2015. (Year: 2015).

Aasheim et al., Knowledge and skill requirement for entry level IT workers, Journal of Information Systems Education, vol. 20(3), pp. 349-356 (Year: 2009).

Tristan Denley, Degree Compass: A Course Recommendation System, EDUCASE, Nov. 23, 2017.

Grewal DS, Kaur K (2016) Developing an Intelligent Recommendation System for Course Selection by Students for Graduate Courses. Bus Eco J 7:209. doi:10.4172/2151-6219.1000209.

Even your academic advisor might one day be a robot, retrieved from https://www.engadget.com/2016/01/14/your-academic-advisor-might-one-day-be-a-robot/.

Chatbot helps students choose courses, retrieved from http://www.bbc.com/news/technology-40960426.

Al-Badarenah and Alsakran, An Automated Recommender System for Course Selection, International Journal of Advanced Computer Science and Applications, vol. 7, No. 3, pp. 166-175, 2016.

Hurwitz, "The impact of legacy status on undergraduate admissions at elite colleges and universities", 2009, retrieved from https://scholar.harvard.edu/files/btl/files/michaeLhurwitz_-_qp_12-12-09.pdf (Year: 2009).

(56) References Cited

OTHER PUBLICATIONS

Murtaugh, Paul A., Leslie D. Burns, and Jill Schuster. "Predicting the retention of university students." Research in higher education 40.3 (1999): 355-371. (Year: 1999).

Thomas Lux, et al., "Applications of Supervised Learning Techniques on Undergraduate Admissions Data", 2016, retrieved from https://dl.acm.org/doi/pdf/10.1145/2903150.2911717 (Year: 2016).

Waters et al., "GRADE: Machine Learning Support for Graduate Admissions", 2013, Proceedings of the Twenty-Fifth Innovative Applications of Artificial Intelligence Conference (Year: 2013).

* cited by examiner

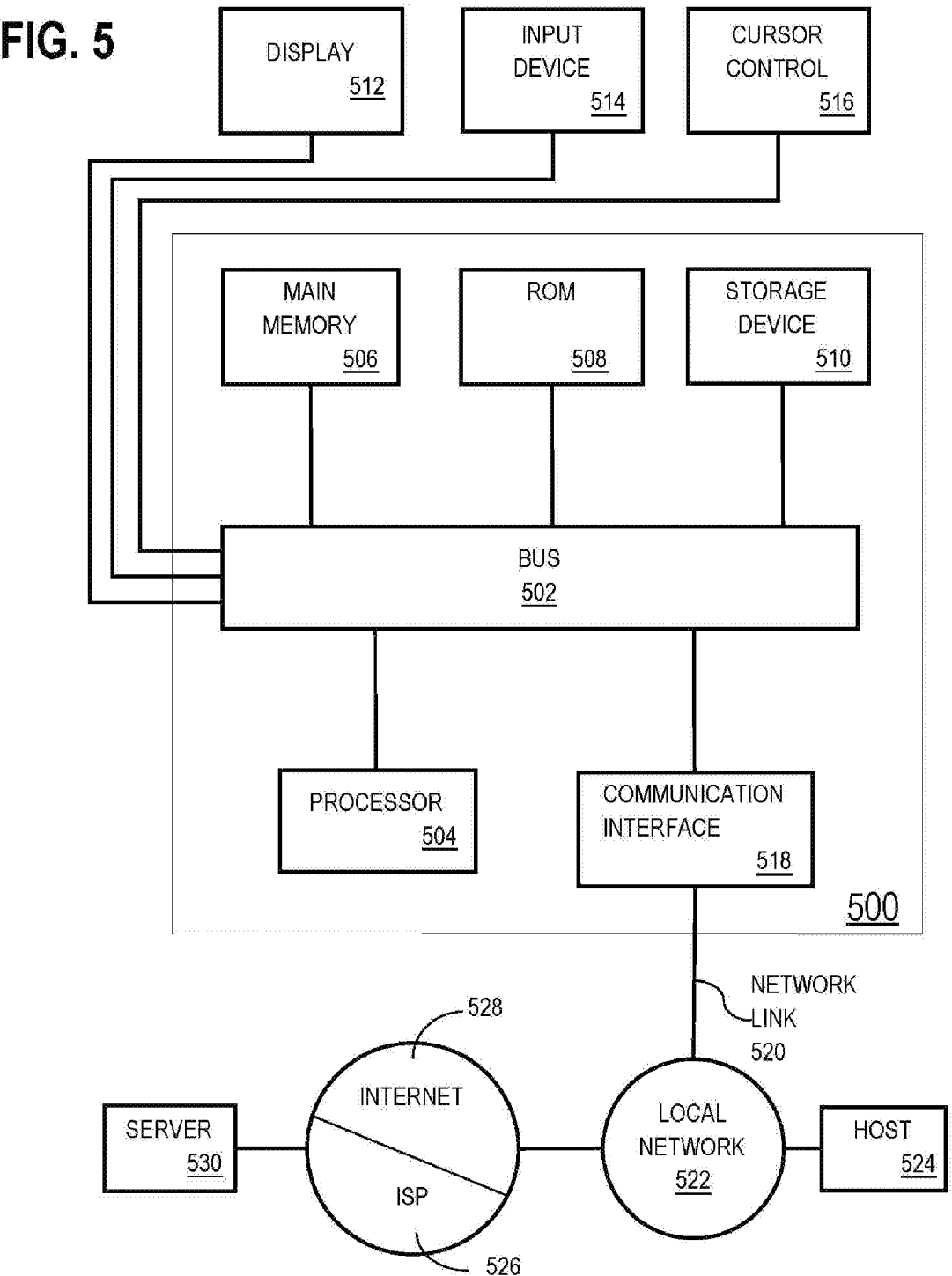

EVENT RECOMMENDATION SYSTEM

BENEFIT CLAIMS; RELATED APPLICATIONS; INCORPORATION BY REFERENCE

This application claims the benefit of U.S. Provisional Patent Application No. 62/566,394, filed Sep. 30, 2017, and U.S. Provisional Patent Application No. 62/566,405, filed Sep. 30, 2017, which are hereby incorporated by reference.

TECHNICAL FIELD

The present disclosure relates to event management and recommendation. In particular, the present disclosure relates to an interface for selecting, ordering, and presenting events for a candidate attendee.

BACKGROUND

A student at a higher education institution must typically interact with multiple systems, web sites, and paper documents to complete tasks. The student may need to complete tasks such as scheduling classes, asking questions, and paying bills. The interaction paradigm in the higher education industry as a whole is a self-service model.

Students are faced with the challenge to choose courses in which to enroll for every academic period. Depending on the context, a student may have many, or few, alternative courses from which to choose. In cases in which many alternative courses are available, the best choice of courses may not be transparent to the student.

A virtual assistant is a software agent used to execute tasks. Generally, a virtual assistant executes a simple task responsive to a request. For example, responsive to the voice command "What is the weather like today?" a virtual assistant obtains, and displays, today's weather forecast. A virtual assistant may accept an instruction from a user via voice commands, text commands, and/or user interaction with a user interface.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 2A-2B illustrate event management interfaces in accordance with one or more embodiments;

FIG. 5 shows a block diagram that illustrates a computer system in accordance with one or more embodiments.

DETAILED DESCRIPTION

Figure 1A:
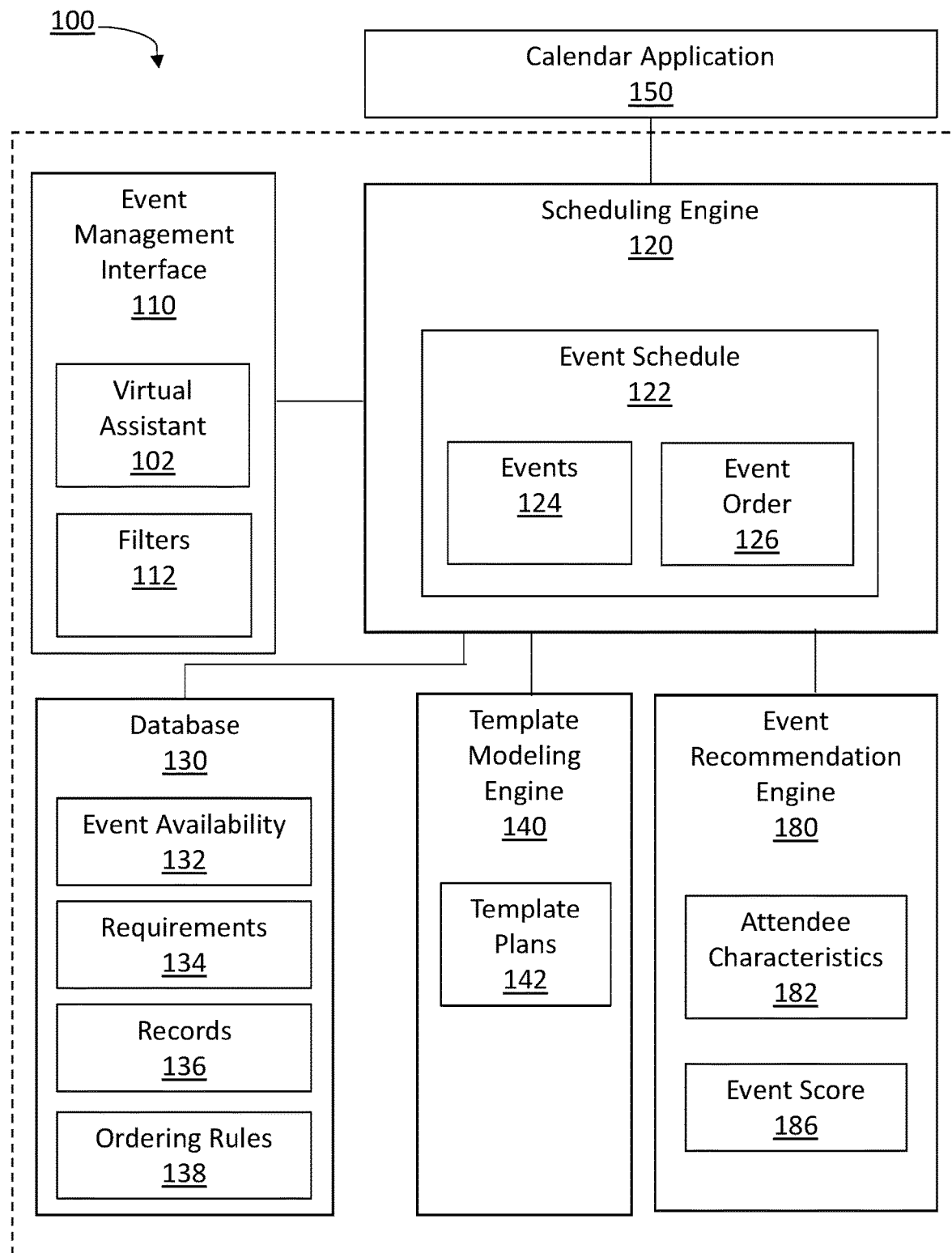
FIGS. 1A-1E illustrate a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. EVENT MANAGEMENT & RECOMMENDATION SYSTEM
3. EVENT MANAGEMENT INTERFACE
   A. COURSE MANAGEMENT INTERFACE
   B. CLASS MANAGEMENT INTERFACE
4. GENERATING AN EVENT SCHEDULE
   A. COURSE PLANNING
   B. CLASS SCHEDULING
5. SELECTING EVENTS FOR RECOMMENDATION
   A. RECOMMENDING A COURSE
   B. RECOMMENDING A CLASS
6. MISCELLANEOUS; EXTENSIONS
7. HARDWARE OVERVIEW

1. General Overview

One or more embodiments include an event recommendation system. The event recommendation system recommends events for a candidate attendee. The event recommendations are based on (a) the characteristics of the candidate attendee and (b) characteristics of prior attendees that attended a prior occurrence of the event. A prior attendee may have a positive experience or a negative experience with the prior occurrence of the event. A positive experience may be defined, for example, as enjoying the event, completing the event, or performing well in the tasks or evaluation metrics associated with the event. A negative experience may be defined, for example, as not enjoying the event, not completing the event, or not performing well in the tasks or evaluation metrics associated with the event. An event is recommended to a candidate attendee if the candidate attendee has similar characteristics to a prior attendee that had a positive experience. An event is not recommended to a candidate attendee if the candidate attendee has similar characteristics as a prior attendee that had a negative experience. A machine-learning algorithm may continually update a database of attendee characteristics associated with positive experiences and attendee characteristics associated with negative experiences. The database is used to generate the event recommendations.

An example of an event, that may be recommended, is a course in a higher education institution. A course is a unit of academic content. English 4 and Introduction to Nursing are courses. Courses may be offered on a reoccurring basis (for example, every semester over several years). Another example of an event, that may be recommended, is a class in a higher education institution. A class is a specific instance of a course. Physics 101, Section A, on Wednesdays in the Spring 2017 semester with Professor Smith, is an example of a class.

One or more embodiments select and recommend courses in a higher education institution. A machine-learning algorithm builds a database of characteristics of students that have done well in a course. Alternatively, or additionally, the machine-learning algorithm builds a database of characteristics of students have not done well in the course. The system recommends the course to a student if the characteristics of the student are similar to the characteristics of students that have done well in the course. The system does not recommend the course to a student if the characteristics of the student are similar to the characteristics of students have not done well in the course.

As an example, the system may recommend or not recommend a course to a current student based on an event score computed for the current student. The event score is computed based on a comparison of the characteristics of the current student with characteristics of prior students that previously took the course. If the characteristics of a current student and the characteristics of a prior student meet a similarity threshold, then the prior student is determined to be similar to the current student. The system identifies a subset of the prior students that are determined to be similar to the current student. If the number or percentage of students, in the subset of prior students, that performed well in the course meets a recommendation threshold, then the course is recommended to the current student. If the number or percentage of students, in the subset of prior students, that performed well in the course does not meet the recommendation threshold, then the course is not recommended to the current student.

One or more embodiments select and recommend classes to a student. The system may identify a set of candidate classes corresponding to a recommended course. The system may select one of the candidate classes based on a location and time of the class, and the student's expected location at or near that time. As an example, Joe has a first class on the north side of a large campus from 9 am to 10:30 am on Wednesdays. The system may recommend a second class, from a set of candidate classes, that is scheduled for the north side of campus at 11 am on Wednesdays. The time and location proximity between the classes helps the student quickly travel from the first class to the second class.

One or more embodiments described in this Specification and/or recited in the claims may not be included in this General Overview section.

2. Event Management & Recommendation System

FIG. 1A illustrates an event management and recommendation system 100 in accordance with one or more embodiments. As illustrated in FIG. 1A, the event management and recommendation system 100 includes an event management interface 110, scheduling engine 120, template modeling engine 140, event recommendation engine 180, and database 130. In one or more embodiments, the event management and recommendation system 100 may include more or fewer components than the components illustrated in FIG. 1A. The components illustrated in FIG. 1A may be local to or remote from each other. The components illustrated in FIG. 1A may be implemented in software and/or hardware. Each component may be distributed over multiple applications and/or machines. Multiple components may be combined into one application and/or machine. Operations described with respect to one component may instead be performed by another component.

In an embodiment, an event 124 is a planned occurrence. As an example, an event 124 is a class or course in a higher education institution. As another example, an event 124 is a business meeting. As another example, an event 124 is a practice session for a team sport.

In an embodiment, an event schedule 122 is an ordered set of events corresponding to an event order 126. The event order 126 may specify the arrangement of a set of events 124 with respect to other events and/or with respect to a timeline. The event order 126 may organize events into time slots. As an example, the event order 126 may specify that four courses are scheduled in the Spring 2016 semester. As another example, the event order may specify time slots throughout the week in which reoccurring classes are to be scheduled.

In an embodiment, the scheduling engine 120 includes hardware and/or software configured to manage an event schedule 122. The scheduling engine 120 may determine how to schedule an event with respect to other events. The scheduling engine 120 may determine an event order 126 for the events 124 based on a set of ordering rules 138. As described further below with respect to database 130, the ordering rules 138 prescribe an order in which events must be completed. The scheduling engine 120 may modify the event schedule according to user input and the set of ordering rules 138. The scheduling engine 120 may enroll an attendee in events, based on the event schedule.

Figure 1B:
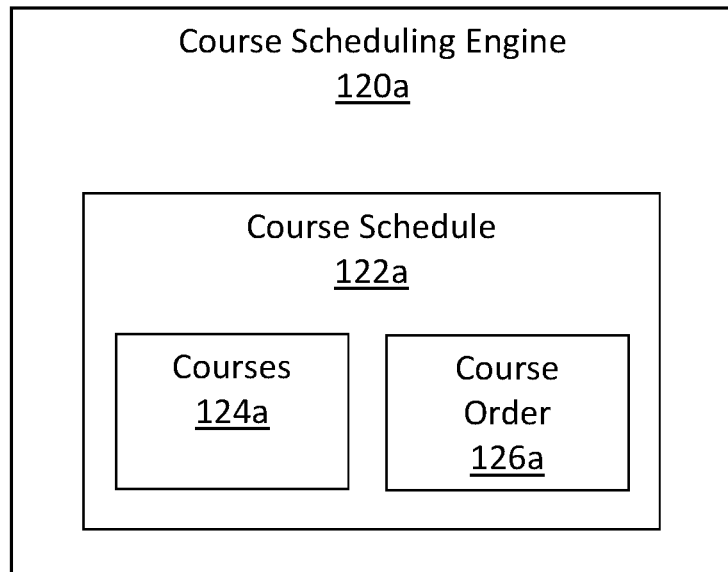
Figure 1C:
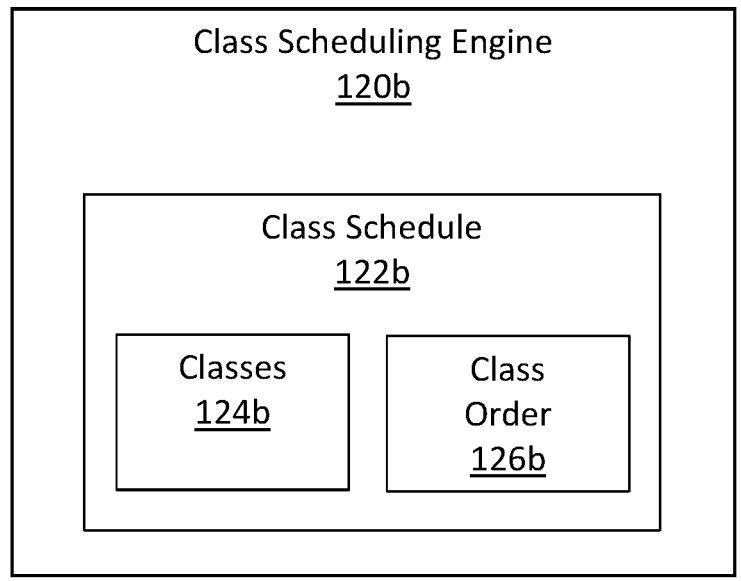

As illustrated in FIGS. 1B-1C, the scheduling engine 120 may be configured to schedule events such as courses and/or classes. FIG. 1B illustrates a course scheduling engine 120*a*. Course scheduling engine 120*a* is configured to generate a course schedule 122*a* comprising a set of courses 124*a*.

In an embodiment, a course 124*a* is a unit of academic content. As an example, Physics 101 is a course. As another example, Introduction to Nursing is a course. A course 124*a* may be, as non-limiting examples, formatted as a lecture, seminar, or lab. A course 124*a* may be an internship, to be completed for credit. Courses may be offered on a reoccurring basis. As an example, Math 101 is offered twice per semester over the course of several years. As another example, English 330 is offered in alternate Spring quarters.

In an embodiment, a course schedule 122*a* (also referred to herein as a course plan) is an ordered set of courses to be completed towards an academic goal. The academic goal may be the completion of an academic program. As examples, the course schedule may correspond to the requirements for completion of an undergraduate degree, graduate degree, or certificate program. A course schedule 122*a* may span across multiple academic terms. As an example, the course schedule 122*a* may include courses to be completed over eight semesters comprised in a four-year plan.

In an embodiment, course order 126*a* is the order in which courses are configured. Courses in a course plan may be grouped by academic term. For example, four courses are assigned to the Spring 2020 semester. Courses in a course plan may be ordered without scheduling a specific time slot. As an example, four courses are listed in Spring 2020, but days and times corresponding to the courses are not specified.

FIG. 1C illustrates a class scheduling engine 120*b*. Class scheduling engine 120*b* is configured to generate a class schedule 122*b* comprising a set of classes 124*b*.

In an embodiment, a class 124*b* is a particular offering of a course. As an example, Physics 101 is offered as Section A, taught by Professor Jones on Mondays, Wednesdays, and Fridays in the Spring 2018 Semester. Physics 101 is also offered as Section B, taught by Professor Smith on Tuesdays and Thursdays in the Spring 2018 Semester. A class 124*b* may be associated with a specific time slot, as with Physics 101 in the previous example. Alternatively, a class may not be allocated a specific time slot. As an example, a final capstone project does not correspond to a particular time slot. As additional examples, a class 124*b* may be an externship, thesis project, seminar, or internship. A class 124*b* may be associated with a particular teacher. A class 124*b* may be associated with a particular location. A class 124*b* may be offered in-person or online.

In an embodiment, a class schedule 122b is an ordered set of classes in a particular academic term. As an example, a class schedule 122b may include three classes for the Spring 2019 semester. The class schedule 122b may specify times, locations, and professors associated with each respective class.

In an embodiment, class order 126b is the order in which classes are configured. The class order 126b may include a specific time slot. As an example, a class schedule 122b specifies that Nursing 301A is scheduled prior to Nursing 330C on Mondays and Wednesdays. Specifically, Nursing 301A is scheduled Mondays and Wednesdays from 9:00 am-10:15 am. Nursing 330C is scheduled Mondays and Wednesdays from 1:00 pm-3:00 pm.

Returning to FIG. 1A, in one or more embodiments, the event management interface 110 refers to hardware and/or software configured to facilitate communications between a user and the scheduling engine 120 and/or the event recommendation engine 180. The event management interface 110 may render user interface elements. The event management interface 110 may receive user input via user interface elements. Examples of interfaces include a graphical user interface (GUI), a command line interface (CLI), a haptic interface, and a voice command interface. Examples of user interface elements include checkboxes, radio buttons, drop-down lists, list boxes, buttons, toggles, text fields, date and time selectors, command lines, sliders, pages, and forms.

In an embodiment, different components of the event management interface 110 are specified in different languages. The behavior of user interface elements is specified in a dynamic programming language, such as JavaScript. The content of user interface elements is specified in a markup language, such as hypertext markup language (HTML) or extensible markup language (XML) User Interface Language (XUL). The layout of user interface elements is specified in a style sheet language, such as Cascading Style Sheets (CSS). Alternatively, event management interface 110 is specified in one or more other languages, such as Java, C, or C++.

In an embodiment, the event management interface 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a mobile handset, a smartphone, a personal digital assistant ("PDA"), and/or a client device.

In an embodiment, the event management interface 110 includes functionality to accept user input to configure an event schedule 122. The event management interface may, for example, accept user input moving an event from one time period to another time period.

In an embodiment, the virtual assistant 102 includes hardware and/or software configured to assist the user in configuring an event schedule. The virtual assistant 102 may guide the user through the process of configuring the event schedule. Additionally, the virtual assistant 102 may assist the user in other tasks. As an example, the virtual assistant may assist a student with completing a college application. As other examples, the virtual assistant may assist the student with obtaining financial aid, paying bills, and obtaining a student identification.

In an embodiment, the virtual assistant 102 communicates with the user via a modal displayed on the event management interface 110. As an example, the virtual assistant 102 may display a pop-up window displaying the text, "Hi, would you like to schedule your classes for the semester?". The virtual assistant 102 may further be configured to receive user input. As an example, the virtual assistant displays buttons labeled "Yes" and "No." Responsive to detecting user input selecting the "Yes" button, the virtual assistant may initiate event scheduling via the scheduling engine 120.

In an embodiment, the virtual assistant 102 includes functionality to proactively initiate actions. As an example, the virtual assistant determines that financial aid paperwork is due in a week. Responsive to determining that financial aid paperwork is coming due, the virtual assistant 102 displays a message asking the user if the user would like to complete a financial aid application.

In an embodiment, the filters 112 are user-configurable guidelines for the scheduling engine 120 to use in selecting and ordering events. As an example, a filter 112 may cause the scheduling engine to disfavor, or refrain from, scheduling events before 2 pm. As another example, a filter 112 may cause the scheduling engine to disfavor, or refrain from, scheduling events during the weekend. As another example, a filter 112 may cause the scheduling engine to refrain from scheduling classes during a particular semester when the student will be interning at a company instead of taking classes. The filters 112 may be displayed via the event management interface 110. As an example, a set of filters are displayed with corresponding slider buttons. The event management interface 110 may receive user input, via the slider buttons, to select a subset of the filters 112.

In an embodiment, the database 130 is any type of storage unit and/or device (e.g., a file system, collection of tables, or any other storage mechanism) for storing data. Further, database 130 may include multiple different storage units and/or devices. The multiple different storage units and/or devices may or may not be of the same type or located at the same physical site. Further, database 130 may be implemented or may execute on the same computing system as the event management interface 110, scheduling engine 120, event recommendation engine 180, and template modeling engine 140. Alternatively, or additionally, the database 130 may be implemented or executed on a computing system separate from the event management interface 110, scheduling engine 120, event recommendation engine 180, and template modeling engine 140. The database 130 may be communicatively coupled to the event management interface 110, scheduling engine 120, event recommendation engine 180, and template modeling engine 140 via a direct connection or via a network.

In an embodiment, event availability 132 describes times in which an event may be scheduled. As an example, the events 124 are college classes. The event availability 132 specifies times that a particular class is offered in a particular semester (e.g., Sculpting 101 is offered in Section A, Mondays 8 am-10am and Section B, Wednesdays 4 pm-6 pm). As another example, the events 124 are fitness classes. The event availability 132 specifies times that a particular fitness class is offered at a gym (e.g. Spinning is offered Tuesday, Thursday, and Saturday from 7 am-8 am).

In an embodiment, the requirements 134 are events to be completed by the attendee to meet an event completion target. As an example, the event completion target is the completion of the coursework needed to earn a law degree. The requirements 134 include completing 20 core courses corresponding to the law degree and 12 units of elective courses.

In an embodiment, the records 136 describe prior occurrences of events in association with attendees. The records 136 may include a list of attendees that attended a particular event. Records 136 may further specify event outcomes. As an example, the event is a course. The records 136 include information specifying students who have enrolled in the course. The records 136 further specify whether each student has passed or failed the course. As another example, the records may specify each student's letter grade in the course. Records 136 may correspond to events at the institution for which an event or event schedule is being generated. Alternatively, or additionally, records 136 may correspond to events at other institutions, such as classes completed by a transfer student.

In an embodiment, the ordering rules 138 prescribe an order in which events must be completed. As an example, the course Painting I is a prerequisite for the course Painting II. Accordingly, an ordering rule 138 prohibits Painting II from being positioned before or concurrently with Painting I in a course schedule. As another example, an ordering rule specifies that the lab section of Chemistry 101 must be scheduled later in the week than the lecture section of Chemistry 101.

In an embodiment, the event recommendation engine 180 includes hardware and/or software configured to select an event for recommendation to a particular attendee. The event recommendation engine 180 may implement a machine-learning algorithm to select events for recommendation based on attendee characteristics 182 and/or records 136. The event recommendation engine 180 may base the selection of events for recommendation on additional factors such as requirements 134 and ordering rules 138.

In an embodiment, the attendee characteristics 182 are parameters describing an attendee. Attendee characteristics may include academic characteristics such as Psychology Major and 3.5 GPA. Attendee characteristics 182 may describe time constraints on an attendee. As examples, a student has a full course load or is working full-time in addition to attending school. Attendee characteristics 182 may include behavioral characteristics. As an example, the system may obtain web browsing data specifying that an attendee spends a certain amount of time per day browsing the internet. Attendee characteristics 182 may correspond to candidate attendees, for whom recommendations are being generated. Attendee characteristics 182 may correspond to prior attendees, who may or may not have enrolled in a particular event in the past.

In an embodiment, the event score 186 is a scoring value attributed to a particular event for a particular attendee. The event score may be determined based on a comparison of attendee characteristics 182 of a candidate attendee for an event and attendee characteristics 182 of prior attendees that attended a prior instance of the event. The event score 186 may be a measure of a candidate attendee's likelihood of having a positive experience with the event.

Figure 1D:
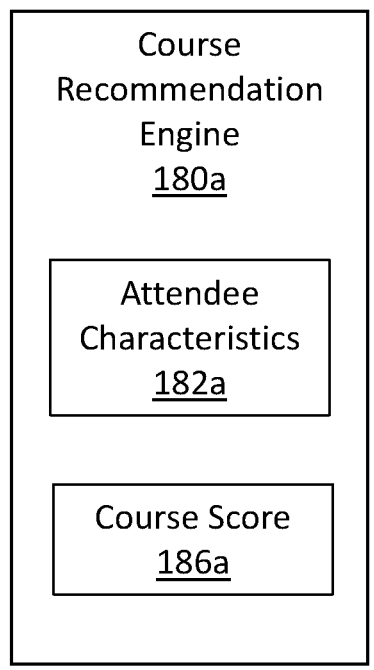
Figure 1E:
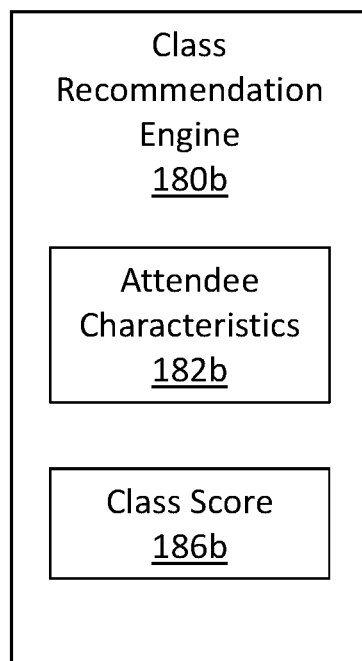

As illustrated in FIGS. 1D-1E, the event recommendation engine 180 may be configured to recommend events such as courses and/or classes. FIG. 1D illustrates a course recommendation engine 180a. Course recommendation engine 180a is configured to recommend one or more courses 124a for a student.

In an embodiment, attendee characteristics 182a include the features described above with respect to attendee characteristics 182 in FIG. 1A. For course recommendation, attendee characteristics 182a may include characteristics that are pertinent to an overall plan of study. As examples, attendee characteristics 182a may include a declared major and a target number of years for degree completion.

In an embodiment, course score 186a is similar to event score 186 described with respect to FIG. 1A. Course score 186a is based on a comparison of attendee characteristics 182a of a candidate attendee for a course and attendee characteristics 182a of prior attendees that have enrolled in a prior occurrence of the course.

FIG. 1E illustrates a class recommendation engine 180b. Class recommendation engine 180b is configured to recommend one or more classes 124b for a student.

In an embodiment, attendee characteristics 182b are similar to the attendee characteristics 182 described above with respect to FIG. 1A. Additionally, attendee characteristics 182b may include availability information. As an example, attendee characteristics 182b may include attendee availability obtained from a linked work calendar. Attendee characteristics 182b may include professor preferences. As an example, a student may specify that the student does not want to take any classes with Professor Smith. Attendee characteristics 182b may include locational information. As an example, the attendee characteristics 182b specify that a student works in New Jersey on Monday mornings.

In an embodiment, class score 186b is similar to event score 186, described above with respect to FIG. 1A. Class score 186b is based on a comparison of attendee characteristics 182a of a candidate attendee for a class and attendee characteristics 182a of prior attendees that have enrolled in the class in prior academic terms. Class score 186b may be further based on the target attendee's availability for the academic term. Class score 186b may further be based on the target attendee's preferences with regard to times, professors, and locations.

Returning to FIG. 1A, a template plan 142 is a default event schedule. Embodiments herein include using the template plan as a starting point for generating an event schedule customized for a particular attendee. As an example, a university department head may configure a template plan corresponding to a suggested plan of study for completing degree requirements. The system may customize the template plan, for an attendee, based on requirements 134 for the attendee's degree, and credits transferred-in or coursework already completed by the attendee. In the higher-education context, template plans may vary by program. A first department may have a 4-year template plan, while a second department has a 5-year template plan. The system may select the appropriate template plan based on the attendee and/or program.

In an embodiment, the template modeling engine 140 updates the template plans 142 based on user input. The template modeling engine 140 may implement a machine-learning algorithm to modify a template plan 142 based on a history of modifications to the template plan. As an example, the system identifies a pattern of multiple attendees rescheduling math classes from prior to 9 am to after 9 am. Based on the pattern, the system modifies the template plan to exclude math classes prior to 9 am. As another example, the system identifies a pattern of multiple attendees rescheduling chemistry courses from a first semester in a course plan to later semesters in the course plan. Based on the pattern, the system modifies the template plan to exclude chemistry courses from the courses selected for the first semester in a course plan.

In an embodiment, the calendar application 150 is an application which includes data describing an attendee's availability. The calendar application 150 may be external to the event management and recommendation system. As an example, the event management system and recommendation system 100 is associated with a university. The event management and recommendation system 100 is used to manage an attendee's continuing education class schedule. The calendar application 150 corresponds to the attendee's employment. The calendar application 150 tracks meetings associated with the attendee's employment. Alternatively, or additionally, the calendar application 150 may be integrated within the event management and recommendation system 100. The calendar application 150 may be an application for tracking the candidate attendee's extracurricular activities at the university for which classes are being scheduled.

The event management and recommendation system 100 may be communicatively coupled to the calendar application 150. The event management and recommendation system 100 may obtain data, from the calendar application 150, for tailoring the event schedule 122 to the candidate attendee's availability.

3. Event Management Interface

A. Course Management Interface

Figure 2A:
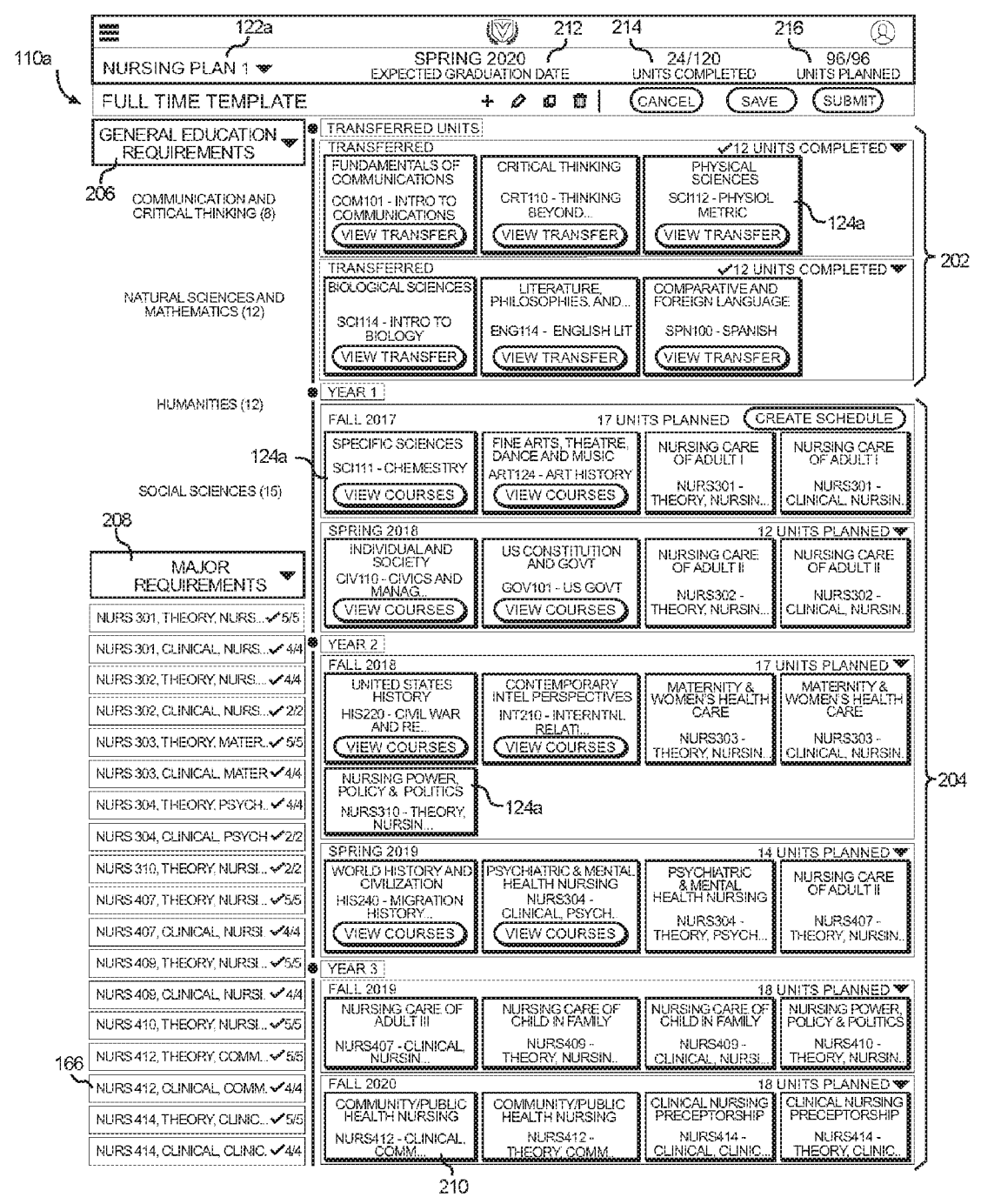

FIG. 2A illustrates an example of a course management interface 110a in accordance with one or more embodiments. A course management interface 110a is a type of event management interface 110. The course management interface 110a illustrates generating, displaying, and modifying a course plan 122a. However, the example is equally applicable to generating, displaying and modifying any type of an event schedule 122. Components and operations described in relation to this example should not be construed as limiting the scope of any of the claims.

The course management interface 110a is used to configure a course plan 122a for a student. The course plan comprises a set of courses 124a that satisfy the requirements for earning a nursing degree at Victory University. A first subset of the courses 124a corresponds to transferred units 202. Transferred units 202 include units corresponding to courses which the student has already completed at another institution. A second subset of the courses 124a correspond to courses 204 which are to be completed at Victory University. The courses to be completed 204 are displayed in association with a corresponding period of time, a semester. The courses in a course plan 122a may represent placeholders for classes to be included in a schedule for a particular semester. As an example, the course plan includes Nursing Elective in the Spring 2020 semester. Based on the course plan, the system generates a schedule for the Fall 2020 semester which includes a particular nursing elective, Nursing 414.

The courses 124a may be reordered based on user input. The system may receive user input modifying the courses. User input modifying the courses may include deleting, reordering, or moving a course to another term. As an example, the course management interface 110a may permit the user to drag and drop a course from one semester to another semester (e.g., a course may be dragged from Spring 2019 and dropped to Spring 2018).

The system may further present a search interface (not shown). Via the search interface, the system may accept user input to search for available courses. The system may accept user input to add courses directly to a time period. The system may further accept user input adding a new time period (e.g., a summer term or an additional semester to finish program requirements).

The course management interface 110a displays a sidebar to show general education requirements 206 and major requirements 208. When a course 124a is added to the course plan 122a, the system may update the requirements panel to reflect requirements satisfied by the course plan. As an example, when a four-unit nursing course, NURS 412

(210) is added to the course plan, the system updates the major requirements panel 208. The course management interface 110a updates the major requirements panel 208 to include a check mark, indicating that the NURS 412 requirement is included in the class schedule (166).

The course management interface 110a displays an anticipated graduation date 212. The course management interface 110a may update the anticipated graduation date 212 as the course schedule is reconfigured.

The course management interface 110a displays units completed 214. The system may determine the units completed 214 based on the records 136. Here, the units completed 214 correspond to 24 transferred units (202).

The course management interface 110a displays units planned 216. The system may determine the units planned 216 based on the course plan. Here, the units planned 216 correspond to the 96 units planned via the courses to be completed 204. The system may update the units planned as the course plan is configured. As an example, if a user were to remove a 4-unit course, the course management interface 110a would update to display 92/96 units planned instead of 96/96 units planned.

Alternatively, or additionally, the system may display a metric in the form (units completed)/(units included in plan)/(units remaining). As an example, a student has completed 2 units, has 2 units planned in a course plan, and needs 4 units to satisfy a requirement. The system displays the metric 2/2/4 for the student, indicating the student's (units completed)/(units included in plan)/(units remaining).

The course management interface 110a may further display a wish-list element (not pictured). The wish-list element may accept user input adding courses to a wish-list of courses. Based on the wish-list, the system may prioritize courses for selection.

B. Class Management Interface

Figure 2B:
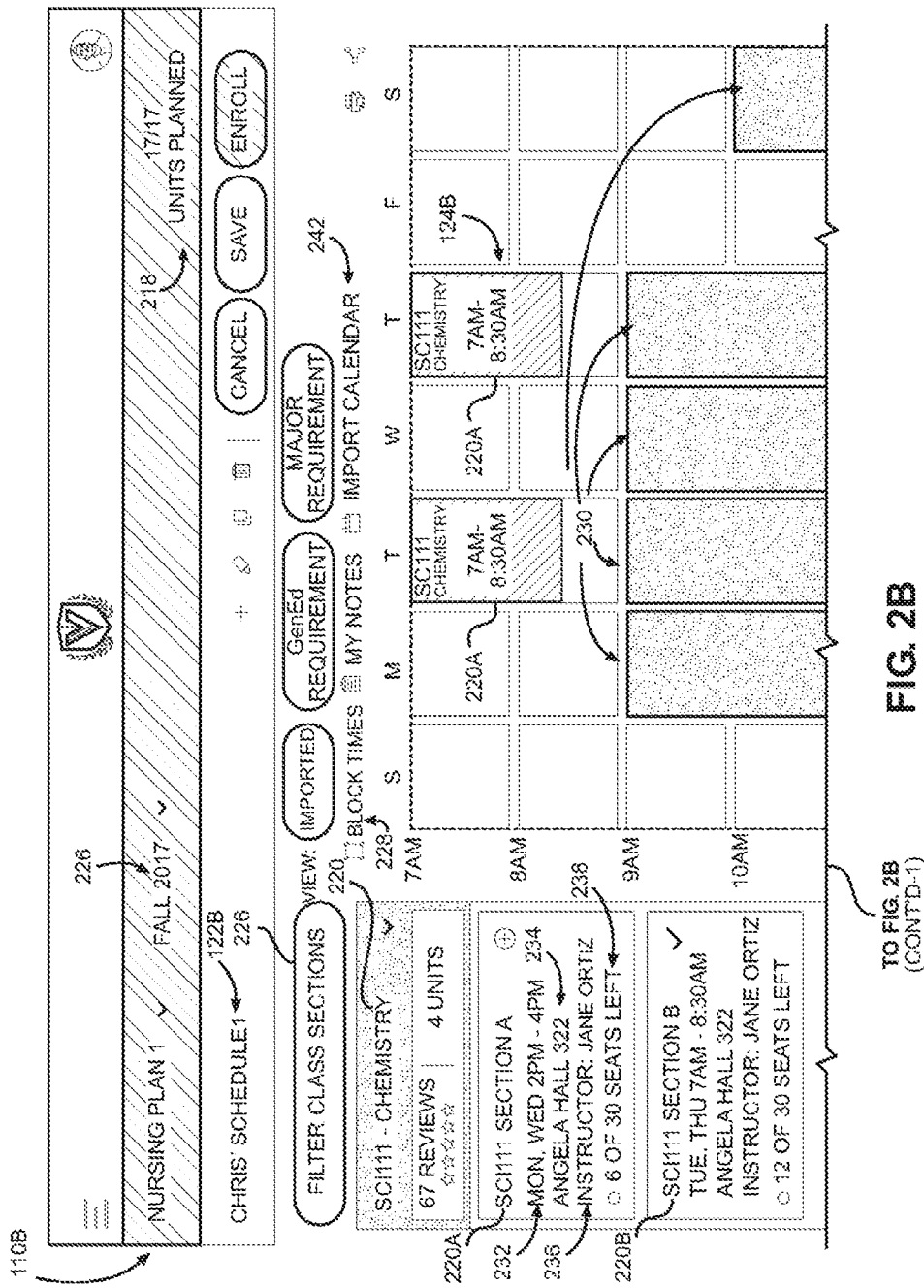

FIG. 2B illustrates an example of a class management interface 110b in accordance with one or more embodiments. A class management interface 110b is a type of event management interface 110. The class management interface 110b illustrates generating, displaying, and modifying a class schedule 122b. However, the example is equally applicable to generating, displaying and modifying any type of an event schedule 122. Components and operations described in relation to this example should not be construed as limiting the scope of any of the claims.

The class management interface 110b is used to configure a class schedule 122b for a particular candidate attendee, Chris. The class schedule 122b includes a set of classes 124b for the Fall 2017 semester (226). The class schedule 122b is a part of Nursing Plan 1. Nursing Plan 1 corresponds to an overall course plan 122a for Chris, as illustrated in FIG. 2A.

The class schedule 122b includes four classes 124b. SCI111—Chemistry (220) is a course to be taken in the Fall 2017 semester. Two class sections (220a, 220b) of course 220 are available. The class management interface 110b displays both sections, along with the corresponding time 232, location 234, professor 236, and availability 238. SCI111 Section A (220a) is offered Mondays and Wednesdays from 2 pm-4 pm (232). SCI111 Section A (220a) is taught by instructor Jane Oritz (236). SCI 111 Section A (220a) is to be held in Angela Hall 322 (234). 12 of 32 seats are available (238) for SCI 111 Section A. SCI111 Section B (220b) is offered Tuesdays and Thursdays from 7 am-8:30 am (232). SCI111 Section B (220b) is taught by instructor Jane Oritz (236). SCI111 Section B (220b) is to be held in Angela Hall 322 (234). 12 of 32 seats are available (238) for SCI111 Section B (220b).

The class management interface 110b further displays course 222—GFA225 Art of the Giant Monster. Two sections of course 222 are available. Each section (222a, 222b) is displayed along with the corresponding time 232, location 234, professor 236, and availability 238.

The class management interface 110b further displays course 224—NURS301 Nursing Care of Adult I. Course 224 includes a clinical section (224a) and a theory section (224b). Each section (224a, 224b) is displayed along with the corresponding time 232, location 234, professor 236, and availability 238.

The class management interface 110b displays the classes 124b both in a calendar and in a sidebar. Via the sidebar, the class management interface 110b may accept user input selecting a class section. As an example, SCI111 Section B has been selected, as indicated by the checkmark in the sidebar. Responsive to receiving user input selecting a section in the sidebar, the class management interface 110b may update the calendar. Alternatively, or additionally, the class management interface 110b may accept user input modifying the schedule through interaction with the calendar. As an example, the class management interface 110b may accept user input dragging-and-dropping SCI111 from Monday to Tuesday. Responsive to the user input, the class management interface 110b may switch the scheduled class from SCI111 Section A, on Mondays and Wednesdays, to SCI111 Section B, on Tuesdays and Thursdays.

The class management interface 110b includes functionality to accept user input to filter class selections. The class management interface 110b displays a button 228 labeled "Filter Class Selections." Responsive to detecting user interaction with the "filter class selections" button, the system may display a modal with a set of filters. The modal may include sliders marked "Morning (before 9 am); Evening (after 5 pm); Late Evening (after 9 pm); and Weekends. The interface may accept user input to select or deselect a time preference by adjusting the sliders. Classes corresponding to selected time preferences may be recommended or scheduled by the system. Classes corresponding to deselected time preferences may not be recommended or scheduled by the system. The modal may further include sliders or other UI elements to allow a user to select formats (e.g. onsite or online). The modal may further include sliders or other UI elements to allow a user to select locations (e.g. San Jose or San Ramon campus).

The class management interface 110b includes functionality to accept user input to manually block times. The class management interface 110b displays a button 228 labeled "block times." Responsive to user interaction with the "block times" button, the class management interface 110b may permit a user to highlight portions of the calendar. Highlighted portions of the calendar may be blocked. For blocked times, the system may refrain from recommending or scheduling a class.

The class management interface 110b includes functionality for the user to import availability from a calendar, such as a work calendar or social calendar. The class management interface 110b displays a button 242 labeled "import calendar." Responsive to user interaction with the "import calendar" button, the class management interface 110b imports a calendar. The system may use information imported from the calendar to block times when the candidate attendee is unavailable. The system may further identify locations based on information imported from the calendar. Using the location of a calendared event, the system may determine a commute time between the location of the event and the location of a class. The system may block times when the candidate attendee is not available by greying out portions of the calendar with time constraints 230. The time constraints 230 show that Chris is not available for courses between 9 am and 4 pm on Mondays, Tuesdays, Wednesdays, and Thursdays. The time constraints 230 further show that Chris is not available for courses between 10 am and 2 pm on Fridays.

Based on factors such as candidate attendee availability, the class management interface 110b may display an alert. In the schedule shown, there is a potential timing conflict between GFA225 Section A (222b) and an event in Chris's calendar. The class management interface 110b displays an alert 240, indicated by an explanation mark, on class 222b on the calendar. Responsive to user interaction with the alert, the class management interface 110b may display a modal explaining the alert. If a user selects the alert, the class management interface 110b may display a modal reading, "(!) Potential Timing Conflict: Your commute is 20 minutes from work and this section starts immediately after. The only other option is a section with a waitlist with the same conflict. How should we proceed?" The modal may include buttons labeled "Switch it," "Keep it," and "Choose a new course." Responsive to user interaction with a button, the class management interface may modify the schedule and/or remove the alert.

4. Generating an Event Schedule

Figure 3:
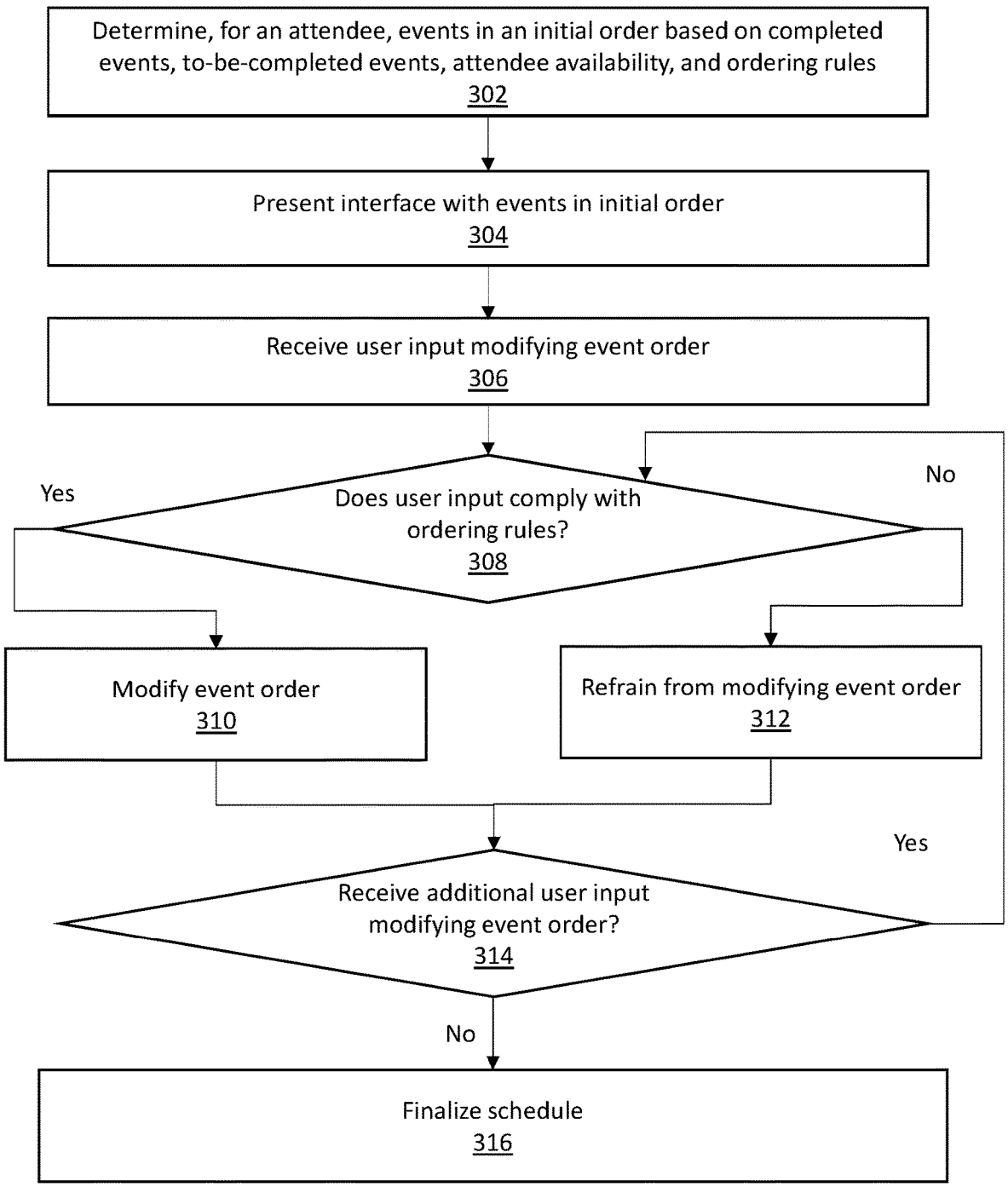
FIG. 3 illustrates an example set of operations for generating an event schedule in accordance with one or more embodiments.

FIG. 3 illustrates an example set of operations for generating an event schedule in accordance with one or more embodiments. One or more operations illustrated in FIG. 3 may be modified, rearranged, or omitted altogether. Accordingly, the particular sequence of operations illustrated in FIG. 3 should not be construed as limiting the scope of one or more embodiments.

In an embodiment, the scheduling engine determines, for an attendee, events in an initial order (Operation 302). The scheduling engine may determine the initial order of events for the attendee based on completed events corresponding to the attendee. The scheduling engine may further determine the initial order of events based on to-be-completed events. As an example, the scheduling engine identifies events in an initial order for a student. The events satisfy the requirements for a Bachelor of Arts degree in English. The scheduling engine determines that the student has completed a portion of the courses required for the degree. The scheduling engine selects courses, from a set of required courses in the English program, which the student has not completed. The scheduling engine identifies a set of courses to-be-completed to satisfy the requirements for the degree. Additionally, the scheduling engine may identify events based on event recommendations generated by the event recommendation engine, as described below in Section 5.

Additionally, or alternatively, the scheduling engine may determine the events in the initial order based on ordering rules. As an example, the scheduling engine generates a course plan comprising a set of courses. The scheduling engine orders the set of courses such that prerequisite requirements are met for each of the courses.

In an embodiment, the scheduling engine determines the initial event order based on attendee availability. The attendee availability may be provided by the attendee. As an example, the system displays, via the event management interface, a pop-up window for configuring filters. The attendee, who works from 8 am to 5 pm on weekdays, selects a filter dictating that events are only to be scheduled on evenings and weekends. Alternatively, or additionally, the system may obtain attendee availability data from a calendar application. As an example, the system may execute a request to pull scheduling data via a web service associated with a calendar application. Prior to obtaining information from a calendar application, the system may request, from the attendee, access to the calendar. As an example, the virtual assistant displays the text, "May I import your work calendar?".

In an embodiment, the scheduling engine determines the events, in the initial order, based on event location. As an example, the scheduling engine includes the classes Math 101A and Science 3 in a class schedule. Math 101A is held on Mondays and Wednesdays at 9 am on the north side of Victory University's Santa Clara campus. Science 3B is held on Mondays and Wednesdays at 1 pm on the west side of Victory University's Santa Clara campus. The scheduling engine determines whether to select section A, B, or C of another class to be scheduled, English 4. The scheduling engine determines the walking path between Math 101A, Science 3B, and each section of English 4. The scheduling engine selects English 4C for the schedule, because English 4C is held Mondays and Wednesdays at 11 am along a convenient walking path between Math 101A and Science 3B. The scheduling engine may further base event selection on a student's schedule outside of the institution corresponding to the events. As an example, a student works in San Francisco on Friday mornings. Accordingly, the system selects a class which is held in San Francisco on Friday afternoons.

In an embodiment, the scheduling engine determines the events, in the initial order, based on a template plan. The scheduling engine may locate a stored template plan corresponding to a particular event schedule. As an example, the system is configuring a course plan which includes the courses required to earn a certificate in early childhood education. The system locates a stored early childhood education template plan comprising an ordered set of courses which a student could take over three semesters. The system presents the events, in the initial order, corresponding to the early childhood education template plan.

In an embodiment, the system updates a template plan based on user input. The system may implement a machine-learning model to update the template plan. The system may keep, or remove, an event based on a score assigned to the event. The score may be assigned to the event based on historical user selection of the event. As an example, the system presents a template plan comprising three required courses and a suggested elective course. A student modifies the event schedule to replace the suggested elective course with a different elective course. The system decrements a score value for the suggested elective course. As students repeatedly reject the suggested elective course, the score for the suggested elective course is further decremented. When the score reaches a threshold value, the system no longer includes the suggested elected course in the template plan.

In an embodiment, the system presents the event management interface with the events in the initial order (Operation 304). The system may display the events with respect to a timeline. As an example, the system displays courses represented by blocks in association with respective semesters, as illustrated in FIG. 2A. Alternatively, or additionally, the system may display the events in a plain-text list. Alternatively, or additionally, the system may display the events in a weekly, daily, or monthly calendar (e.g., the weekly calendar illustrated in FIG. 2B).

In an embodiment, the event management interface receives user input modifying the initial event order (Operation 306). The event management interface may receive user input modifying the initial event order via a drag-and-drop operation. As an example, the user drags a course from the Fall 2014 semester to the Spring 2013 semester. As another example, the user drags a class from Tuesday/Thursday to an alternate class section on Monday/Wednesday. Alternatively, the event management interface may receive user input modifying the event order via text input. As an example, the user deletes a weekly meeting from a first time slot. The user types the weekly meeting into a second time slot.

Alternatively, the system may receive user confirmation accepting the events in the initial order. The user may elect not to modify the event order. As an example, the virtual assistant displays the text, "I've prepared a schedule for your classes this semester. Do you have any changes?". The virtual assistant displays buttons labeled "Yes" and "No." The system receives user input selecting "No," indicating acceptance of the events in the initial order. If the user accepts the events in the initial order, then operations 306-314 may be omitted from the sequence of operations.

In an embodiment, the system determines whether the user input complies with ordering rules (Operation 308). The system may compare the new event order, indicated by the user input, with stored ordering rules. As an example, a user attempts to move a particular course in a course schedule. The system determines both: (a) whether another course that is a prerequisite for the particular course is now scheduled prior to the particular course, and (b) whether the particular course is a prerequisite for a course that is now scheduled subsequent to the particular course.

As a detailed example, the system displays a proposed study plan for a physics bachelor's degree program. A user attempts to move a course, Physics 562, to an earlier position in the first semester of the study plan. However, Physics 562 requires two years of prerequisite courses. Accordingly, the system determines that the modification does not comply with the ordering rules. As another example, the user attempts to move Physics 562 to a later position in the eighth semester of the study plan. However, Physics 562 is a prerequisite for Physics 570, scheduled in the seventh semester of the study plan. Accordingly, the system determines that the modification does not comply with the ordering rules. As another example, the user attempts to move Physics 522 to a later position in the fifth semester in the study plan. The prerequisites for Physics 522 are scheduled prior to the fifth semester. Physics 522 is not a prerequisite for any other courses. Accordingly, the system determines that the modification complies with the ordering rules.

In an embodiment, the system may determine that a modification is permitted, or not permitted, based on non-course requirements. As an example, enrollment in a particular class may be contingent upon professor approval. If the system identifies a lack of professor approval for such a class, the system may determine that the modification does not comply with the ordering rules. As another example, course enrollment may be contingent on a student scoring above a threshold score on an entrance exam. If the system identifies that a student scored above the threshold score, the system may determine that the addition of the course to a course plan complies with the ordering rules.

In an embodiment, the system modifies the event order (Operation 310). The system may modify the event order upon determining that the user input complies with the ordering rules. The system may modify the order of events, in the event schedule, as directed by the user.

In an embodiment, the system refrains from modifying the event order. (Operation 312). The system may refrain from modifying the event order upon determining that the user input does not comply with the ordering rules. The system may retain the initial order.

In an embodiment, the system determines whether additional user input is received modifying the event order (Operation 314). As an example, the system may detect user input moving a second event to a different position in the timeline via a drag-and-drop operation. If the system receives additional user input modifying the event order, then the system may repeat operations 308-312, as described above.

In an embodiment, the scheduling engine finalizes the event schedule. (Operation 316). The scheduling engine may finalize the event schedule upon determining that no additional user input has been received modifying the event order. Alternatively, or additionally, the scheduling engine may finalize the event schedule upon receiving an instruction, from the user, to finalize the event schedule. As an example, the system detects that the user has clicked a "Complete Plan" button on the event management interface.

The scheduling engine may finalize the event schedule by saving the event schedule. The scheduling engine may save the event schedule to the database and/or a device associated with the attendee.

In an embodiment, the scheduling engine may enroll the attendee in events based on the event schedule. As an example, the system generates an event schedule comprising the attendee's classes for a semester. The scheduling engine enrolls the attendee in the classes via a university enrollment system.

In an embodiment, the system monitors an event for availability changes. As an example, the system has generated a class schedule for a student for a semester. The system periodically obtains enrollment data for the classes in the schedule via a university enrollment system. The system may, for example, execute a polling operation via an exposed Application Programming Interface (API) of a university enrollment system. If the system determines that an event is no longer available, or an event may soon become unavailable, the system may execute an appropriate action. Appropriate actions may include notifying the attendee and/or enrolling the attendee in the event. As an example, the system determines that there is only one seat left in a class. Accordingly, the system enrolls the attendee in the class and transmits a notification to the attendee. As another example, the system determines that a class in an attendee's schedule has become full. The system may present a message to the attendee asking whether the attendee wants to be placed on a wait list. Alternatively, the system may modify the attendee's schedule to replace the full class with an available class.

In an embodiment, the system may generate a first event schedule based on a previously-generated event schedule. As an example, the system generates a course plan which includes courses over 5 semesters. The course plan specifies four courses for the Spring 2018 semester. Based on the course plan, the system generates a class schedule for the Spring 2018 semester, including four classes corresponding to the four courses in the course plan. As another example, the system may update a course plan based on classes in a class schedule. A course plan includes English 101 in the Spring 2018 semester. The system determines that English 101 has been scheduled in the Fall 2017 semester. Accordingly, the system updates the course plan to move English 101 from the Spring 2018 semester to the Fall 2017 semester.

A. Course Planning

The following detailed example illustrates operations in accordance with one or more embodiments. The following detailed example should not be construed as limiting the scope of any of the claims. The system identifies a new student enrolled in a nursing program at Victory University. The system determines a proposed course plan for the student.

The system identifies a template plan. The template plan lists thirty-two courses, arranged as four courses per semester over eight semesters. Together, the thirty-two courses satisfy the requirements for the nursing program. The system identifies records corresponding to the student's transfer credits. The student has completed six courses that satisfy various requirements of the nursing program. Accordingly, the system adjusts the course plan to omit courses for which the student has already fulfilled the corresponding requirement.

The system presents, to the student via the virtual assistant, the message, "Hi! Are you ready to make a course plan for your nursing degree?". The system displays, below the message, buttons labeled "Yes" and "No." The system receives user input selecting the "Yes" button. The event management interface displays a visual representation of the course plan. The course plan may be displayed via a timeline of semesters as illustrated in FIG. 2A.

The system receives user input adjusting the position of a course in the plan. The student drags and drops the course Adult Nursing Care III from Fall 2019 to Spring 2018. The system analyzes the user input in light of stored ordering rules. The ordering rules dictate that Adult Nursing Care III must be taken subsequent to Adult Nursing Care II. The system determines that the user input would result in Adult Nursing Care II and Adult Nursing Care III being taken concurrently. Accordingly, the system determines that the user input does not comply with the ordering rules. The system refrains from modifying the event order. The system displays, via the virtual assistant, the message, "Sorry, you cannot take Adult Nursing Care III until you have passed Adult Nursing Care II." Adult Nursing Care III remains in the Fall 2019 position.

The system receives additional user input. The student drags and drops Adult Nursing Care III from Fall 2019 to Spring 2019. The system determines that the second user modification would result in Adult Nursing Care III being scheduled subsequent to Adult Nursing Care II. Accordingly, the system determines that the user input complies with the ordering rules. The system modifies the event order according to the user input.

The system displays, via the virtual assistant, the message, "OK, I made the changes. Do you want to make any other changes?" The system displays, below the message, buttons labeled "Yes" and "No." The system receives user input selecting "No." The system finalizes the schedule by storing the study plan to the database.

B. Class Scheduling

The following detailed example illustrates operations in accordance with one or more embodiments. The following detailed example should not be construed as limiting the scope of any of the claims. The system determines that a student at Victory University has not enrolled in any courses for the upcoming Fall 2017 semester. Accordingly, the system determines a proposed class schedule for the student for the upcoming semester.

The system identifies a previously generated course plan for the student (e.g., the course plan shown in FIG. 2A). The system identifies four courses that are in the student's course plan for the Fall 2017 semester. The system further identifies records corresponding to classes the student has completed at Victory University. The system further identifies records corresponding to the student's transfer credits. Based on the courses in the course plan, and the student's completed classes, the system generates an initial class schedule.

The system presents, to the student via the virtual assistant, the message, "Hi! Are you ready to make a class schedule for next semester?". The system displays, below the message, buttons labeled "Yes" and "No." The system receives user input selecting the "Yes" button. The class management interface displays a visual representation of the class schedule. The class schedule may be displayed via a weekly calendar as illustrated in FIG. 2B.

The system displays a modal comprising the message, "Would you like me to import your work calendar?". The system displays, below the message, buttons labeled "Yes" and "No." The system receives user input selecting the "Yes" button. The system imports data from a third-party calendar application. The data specifies that the student works Tuesdays and Thursdays from 7 am to 1 pm. Accordingly, the system adjusts the schedule so that the student does not have classes between 7 am and 1 pm on Tuesdays and Thursdays. Further, the system determines that the student has a 20-minute commute from work to school. Accordingly, the system schedules the classes on Tuesdays and Thursdays to allow for commute time.

The system presents the updated proposed schedule to the student. The system presents a modal with the message, "Here is the schedule I have prepared. Would you like to make any changes?".

The system receives user input adjusting the position of a class in the schedule. The student drags and drops the course Math 101 from 9 am Monday to 2 pm Monday. The system analyzes the user input in light of class availability. The system determines that Math 101 is not available at 2 pm on Mondays, but Math 101 is available at 2 pm on Fridays. The system further determines that the student is available at 2 pm on Fridays. The system displays, via the virtual assistant, the message, "Math 101 is available at 2 pm on Fridays or 9 am on Mondays. What should we do?". The system further displays buttons labeled "Keep it, and "Move it." Responsive to detecting user selection of the "Move it" button, the system reschedules Math 101 to 2 pm on Fridays.

The system receives additional user input. The student selects a button labeled "Filter Classes." The system displays a modal displaying a list of campuses, professors, and course formats. The student deselects two professors. Responsive to identifying the deselected professors, the system changes the section of English 4 in the student's schedule, so that the student is not scheduled in any classes from any deselected professors.

The system displays, via the virtual assistant, the message, "OK, I made the changes. Do you want to make any other changes?" The system displays, below the message, buttons labeled "Yes" and "No." The system receives user input selecting "No." The system finalizes the schedule by storing the class schedule to the database.

5. Selecting Events for Recommendation

Figure 4:
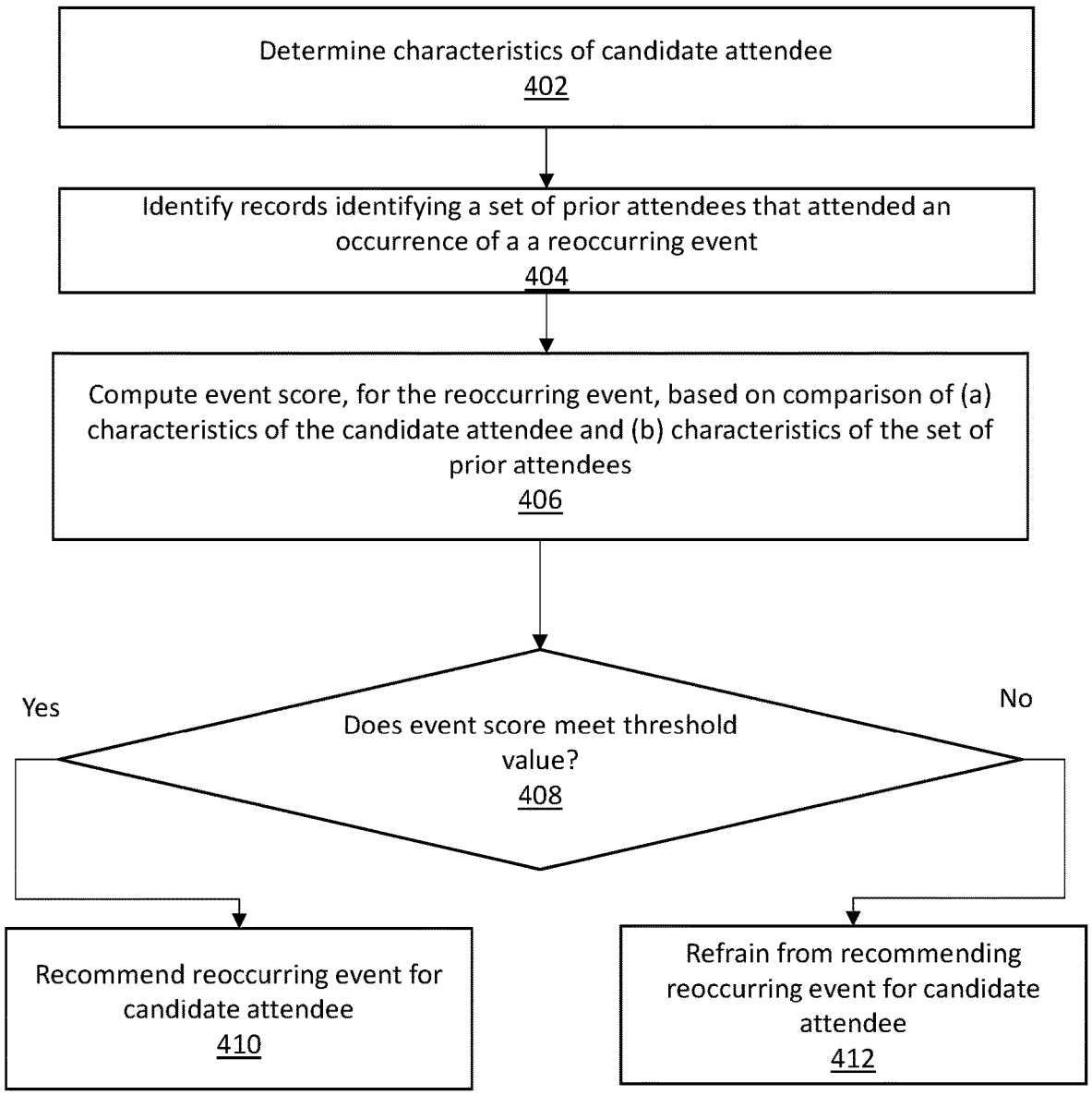
FIG. 4 illustrates an example set of operations for recommending an event for a candidate attendee in accordance with one or more embodiments.

FIG. 4 illustrates an example set of operations for selecting events for recommendation in accordance with one or more embodiments. One or more operations illustrated in FIG. 4 may be modified, rearranged, or omitted altogether. Accordingly, the particular sequence of operations illustrated in FIG. 4 should not be construed as limiting the scope of one or more embodiments.

In an embodiment, the event recommendation engine determines characteristics of a candidate attendee (Operation 402). The event recommendation engine may retrieve stored characteristics of the candidate attendee. Alternatively, or additionally, the event recommendation engine may determine characteristics of the candidate attendee via user input. As an example, the virtual assistant presents the message, "Do you work nights?". The system receives user input specifying that the candidate attendee works nights. The system stores "Works Nights" as a characteristic of candidate attendee.

In an embodiment, the event recommendation engine identifies records identifying a set of prior attendees that have attended an occurrence of a reoccurring event (Operation 404). The event recommendation engine may select a particular reoccurring event for analysis. As an example, the event recommendation engine may select a particular course from a subset of available courses. The subset of available courses may be selected based on factors such as prerequisite requirements and courses completed by the candidate attendee. The event recommendation engine may select a particular reoccurring event based on an event schedule and/or major. As an example, the recommendation engine identifies a potential elective class for recommending to Jane Doe in Fall 2020, based on a course plan stored for Jane Doe's English degree program.

Alternatively, or additionally, the event recommendation engine may select a reoccurring event based on another event that the candidate attendee attended. As an example, the candidate attendee completed a course, English 4. The event recommendation selects a course, Literature 109, because other students that completed English 4 also completed Literature 109. The course, Literature 109, may be selected based further on determining that the candidate attendee's major is related to Literature 109.

Alternatively, or additionally, the event recommendation engine may select a reoccurring event based on an interest profile corresponding to the candidate attendee. The interest profile may, for example, include interests of the candidate attendee obtained from web browsing data and/or surveys associated with the candidate attendee.

Alternatively, or additionally, the event recommendation engine may select a reoccurring event based on popularity of the event. The event recommendation engine may establish a threshold number or threshold percentage of event attendees to attend the reoccurring event in a prior time period. If the number of event attendees that attended the reoccurring event meets the threshold, the event recommendation engine may select the reoccurring event.

In an embodiment, the event recommendation engine identifies records corresponding to the prior attendees in association with the event. The event recommendation engine may analyze the records to identify characteristics of the prior attendees. The event recommendation engine may identify characteristics of prior attendees that had a positive experience with a prior occurrence of the event. As an example, the event recommendation engine identifies characteristics of prior attendees who have enrolled in and/or passed Chemistry 101. Alternatively, or additionally, the event recommendation engine may identify characteristics of prior attendees that had a negative experience with a prior occurrence of the event. As an example, the event recommendation engine identifies characteristics of prior attendees who have failed Chemistry 101. As another example, the event recommendation engine identifies characteristics of prior attendees that did not enjoy an opera performance.

In an embodiment, the event recommendation engine computes an event score for the reoccurring event (Operation 406). The event recommendation engine may compute the event score based on a comparison of (a) characteristics of the candidate attendee and (b) characteristics of the set of prior attendees. To determine the event score, the system may identify characteristics which are shared between the candidate attendee and the prior attendees. Alternatively, or additionally, the system may identify characteristics which differ between the candidate attendee and the prior attendees. The system may compare the characteristics using a subset of prior attendees. As an example, the system may identify characteristics which are shared between the candidate attendee and prior attendees that have reported enjoying the reoccurring event.

The system may compute the event score by incrementing and/or decrementing a value, based on the comparison. As an example, the system may increment an event score, for a candidate attendee, for each characteristic that the candidate attendee shares with prior attendees that had a positive experience with a prior occurrence of an event. The system may decrement the event score for characteristics that the candidate attendee shares with prior attendees that had a negative experience with a prior occurrence of an event. The system may modify the event score based on a comparison of particular attendee characteristics in association with the event. As an example, the system may increment or decrement the event score based on whether the candidate attendee shares characteristics with prior attendees who have received an A grade in a course. The characteristics compared may include academic characteristics such as grades, as well as non-academic characteristics such as demographic information. The characteristics compared may include student experiences. As an example, if the candidate attendee and the set of prior attendees both participated in a foreign exchange program in Japan, the system may increase the event score for a class completed by the set of prior attendees.

In an embodiment, the event score is based on a success rate of each of the set of prior attendees. Success may be measured according to one or more metrics. As examples, succeeding may be defined as graduating from an educational institution, obtaining employment after graduating, or graduating within a threshold time period (e.g., four years). Based on the success rate of the prior attendees, the event score may be increased. As an example, 70% of prior students that took a particular class historically graduated early. Accordingly, the system increases event score for the particular class.

In an embodiment, the event recommendation engine refines the event score based on characteristics of the candidate attendee. As an example, the system may increment or decrement the event score based on the candidate attendee's interests. The system may increment an event score if the candidate attendee has indicated an interest in the subject matter of the event on social media or by web browsing history. The system may increment an event score if the candidate attendee has indicated an interest in the subject matter of the event by attending similar events at a current or prior educational institution.

In an embodiment, the event score is based on institutional preferences. As an example, the system is selecting a class to recommend for a freshman student. The student is scheduling classes for the student's first semester at a college. The college requires freshmen to take both math and English in the first year of attendance. The college has specified a preference to enroll half of incoming freshmen in math in the first semester of attendance. The college has specified a preference to enroll half of incoming freshmen in English in the first semester of attendance. The preferences are established to evenly distribute the freshmen between math and English. The system determines that more freshmen are currently enrolled in math than in English. Accordingly, the system increments the event score for the student for English. The system decrements the event score for the student for math. As another example, the system may increment or decrement the event score based on a target number of students for a class. The target number of students for the class may correspond to distributing students evenly, as described above. Alternatively, or additionally, the target number of students for the class may correspond to available seats in a class.

In an embodiment, the event recommendation engine determines whether the event score meets a threshold value (Operation 408). The event recommendation engine may retrieve a stored threshold value. The event recommendation engine may compare the event score to the threshold value, to determine whether the event score meets the threshold vale.

In an embodiment, the system recommends the reoccurring event for the candidate attendee (Operation 410). The system may recommend the reoccurring event if the event score meets the threshold value.

The system may recommend the reoccurring event by presenting the event directly to the candidate attendee. The system may recommend an event with or without the event management interface. The system may recommend an event by including the event in an event schedule presented via the event management interface. The system may recommend a particular time period for the candidate attendee to attend the event based on prior events attended by the candidate attendee. As an example, the system may only recommend a course in an upcoming semester after determining that a pre-requisite for that course has been completed. The system may recommend a particular time period for the candidate attendee to attend the event based an event schedule for the candidate attendee. As an example, during December 2017, the system may recommend a course for the fall semester in 2018 based on a pre-requisite for the course being scheduled for the candidate attendee during the spring semester in 2018. The system may request user input accepting or rejecting the recommendation. Alternatively, or additionally, the system may present the recommendation on a stand-alone basis, via the event management interface. Alternatively, or additionally, the system may present the recommendation via email or text message. As an example, the system recommends two continuing education courses, for a candidate attendee, via email. As another example, the system recommends a medical convention for a candidate attendee via text message. Alternatively, or additionally, the system may present the recommendation via the virtual assistant.

In an embodiment, the system may recommend the reoccurring event for the candidate attendee by presenting the event to an administrator, such as a school counselor or a travel agent. As an example, the system may present a course recommendation to a guidance counselor via email. The guidance counselor can assess the recommendation and approve or reject the recommendation. An approved recommendation may be presented to the student via the event management interface. Alternatively, or additionally, the guidance counselor may recommend the course to the student in-person or via email.

In an embodiment, the system refrains from recommending the reoccurring event for the candidate attendee (Operation 412). The system may refrain from recommending the event if the event score is less than the threshold value.

A. Recommending a Course

The following detailed example illustrates operations in accordance with one or more embodiments. The following detailed example should not be construed as limiting the scope of any of the claims. The system selects a course to recommend for inclusion in a course plan for a student, Chris Sanchez.

The system determines characteristics of Chris. The system determines that Chris is a transfer student. The system determines that Chris is 20 years old, male, Caucasian, and from Arizona. The system determines that Chris earned a 3.6 GPA at the college from which Chris is transferring. The system determines that Chris earned a 3.3 GPA in high school. The system determines that Chris participates in hockey and water polo. The system determines that Chris is a political science major. The system determines that Chris spends an average of two hours a day browsing the internet.

The system identifies a potential course to include in the course plan. Much of the course plan is determined based on a template plan for a political science transfer student. There are several openings for elective courses that are flexible in the template plan. The system analyzes one potential elective course, Introduction to Pottery.

The system identifies event records for students that have previously enrolled in Introduction to Pottery. The system identifies characteristics for each of the students that has enrolled in Introduction to Pottery. The characteristics include demographic characteristics, as listed above for Chris Sanchez. Additionally, the characteristics identified for prior students include whether the students passed, failed, or dropped Introduction to Pottery. The characteristics identified for prior students further includes a grade received by the students in Introduction to Pottery. The characteristics identified for prior students further include an overall GPA for the students in the semester in which the students took Introduction to Pottery.

The system compares the characteristics of Chris Sanchez to the characteristics of the set of prior attendees that have previously attended Introduction to Pottery. The system uses a machine-learning model to compute the event score based on interrelated attendee characteristics.

The system divides prior attendees of Introduction to Pottery into two groups: those who received a grade of C or better in the course, and those who did not receive a grade of C or better. Characteristics of Chris are compared to the characteristics of the students that received a grade of C or better. For each characteristic that Chris shares with a particular student that received a C, Chris's event score is incremented by 0.01. for each characteristic that Chris shares with a particular student that received a B, Chris's event score is incremented by 0.03. for each characteristic Chris shares with a particular student that received an A, Chris's event score is incremented by 0.08. Based on the comparison, the system assigns Introduction to Pottery an event score of 8 for Chris Sanchez.

The system refines the event score based on Chris's interests. The system determines that Chris follows pottery-related pages on social media. The system determines that Chris has frequently enrolled in art classes in the past. Accordingly, the system increments Chris's event score from 8 to 9.

The system compares the event score of 9 to a threshold value for recommendation. The threshold value for recommendation is 7. Accordingly, the system determines that the event score meets the threshold value.

Based on the event score meeting the threshold value, the system recommends Introduction to Pottery for Chris. The system recommends the course by including the course in a course schedule presented to Chris Sanchez via the course management interface.

B. Recommending a Class

The following detailed example illustrates operations in accordance with one or more embodiments. The following detailed example should not be construed as limiting the scope of any of the claims. The system selects a class to potentially recommend for Chris Sanchez for the Fall 2019 semester. Chris is a sophomore at Victory University studying political science.

A class may be recommended using the same considerations described above with respect to recommending a course in Section 5A (given that a class is a specific instance of a course). Additionally, the system may factor in class-specific elements such as location, time slots, and professors, when selecting a class for recommendation.

The system identifies characteristics for Chris, as described above with respect to Section 5A. The system further identifies availability and preferences for Chris. Chris has specified, via the class management interface, that he does not want to take any classes before 10 am. Chris has also specified that he prefers to take classes taught by a professor, rather than by a teaching assistant.

The system uses a machine-learning model to compare characteristic for Chris to characteristics for students that have previously taken Introduction to Pottery, as described above with respect to Section 5A. The system computes an event score. Overall, Introduction to Pottery receives an event score of 9. In addition to comparison of Chris's characteristics and characteristics of students that have previously enrolled in Introduction to Pottery, the system accounts for Chris's availability and preferences. The system analyzes two sections of Introduction to Pottery. Section A is offered at 11 am and is taught by a professor. Section B is offered at 9 am and is taught by a professor. Section C is offered at 2 pm and is taught by a teaching assistant. Based on Chris's preference for scheduling classes after 9 am, the event score for Section B is decremented by 4 points to 5. Based on Chris's preference for classes taught by a professor, the event score for Section C is decremented by 3 points to 6. Accordingly, Section A has the highest event score of 9.

The system compares the respective event score for each section to a threshold value of 7. The system determines that the event score for Section A meets the threshold value, while the event scores for Sections B and C do not meet the threshold value. Accordingly, the system recommends Introduction to Pottery Section A to Chris. The system refrains from recommending Introduction to Pottery Sections B and C to Chris. The system recommends introduction to Pottery Section A by including the class in a class schedule. The class schedule is presented to Chris via the class management interface.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522.

For example, communication interface 518 may be an integrated-services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world-wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 350 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   identifying characteristics of a first set of prior attendees that attended a first reoccurring event;
   comparing characteristics of a candidate attendee with the characteristics of the first set of prior attendees to determine a first score for the first reoccurring event with respect to the candidate attendee;
   responsive to determining that the first score exceeds a first threshold value, recommending the first reoccurring event for the candidate attendee;
   identifying characteristics of a second set of prior attendees that attended a second reoccurring event;
   comparing characteristics of the candidate attendee with the characteristics of the second set of prior attendees to determine a second score for the second reoccurring event with respect to the candidate attendee;
   responsive to determining that the second score does not exceed a second threshold value, refraining from recommending the second reoccurring event for the candidate attendee.

2. The medium of claim 1, wherein the first set of prior attendees had a positive experience with the first reoccurring event, and the second set of prior attendees had a negative experience with the second reoccurring event.

3. The medium of claim 2, wherein the positive experience with the first reoccurring event comprises one or more of: enjoying the first reoccurring event, completing the first reoccurring event, receiving a particular score in a task associated with the first reoccurring event, or receiving a particular score in an evaluation metric associated with the first reoccurring event.

4. The medium of claim 2, wherein the negative experience with the second reoccurring event comprises one or more of: not enjoying the second reoccurring event, not completing the second reoccurring event, not receiving a particular score in a task associated with the second reoccurring event, or not receiving a particular score in an evaluation metric associated with the second reoccurring event.

5. The medium of claim 1, wherein comparing the characteristics of the candidate attendee with the characteristics of the first set of prior attendees comprises one or more of:
   determining whether the candidate attendee has similar characteristics to a particular prior attendee, of the first set of prior attendees, that had a positive experience with the first reoccurring event; or
   determining whether the candidate attendee has similar characteristics to a particular prior attendee, of the second set of prior attendees, that had a negative experience with the second reoccurring event.

6. The medium of claim 1, wherein the operations further comprise selecting the first reoccurring event responsive to a threshold number or threshold percentage of event attendees in a prior time period attending the first reoccurring event from a set of available events.

7. The medium of claim 1, wherein recommending the first reoccurring event for the candidate attendee comprises recommending a particular time period for the candidate attendee to attend the first reoccurring event based on (a) prior events attended by the candidate attendee or (b) an event schedule for the candidate attendee.

8. The medium of claim 1, wherein the first reoccurring event is a first course and the second reoccurring event is a second course.

9. The medium of claim 8, wherein selecting the first course is responsive to determining (a) both the candidate attendee and the first set of prior attendees previously attended a second course, and (b) the first course is associated with a major of the candidate attendee or an interest profile corresponding to the candidate attendee.

10. The medium of claim 1, wherein the first reoccurring event is a first class and the second reoccurring event is a second class.

11. The medium of claim 1, wherein the characteristics of the first set of prior attendees include one or more of: demographic information of each of the first set of prior attendees, behavioral characteristics of each of the first set of prior attendees, and a success rate of each of the first set of prior attendees.

12. The medium of claim 1, wherein recommending the first reoccurring event for the candidate attendee comprises displaying the first reoccurring event to the candidate attendee via a user interface.

13. The medium of claim 1, wherein recommending the first reoccurring event for the candidate attendee comprises:
   displaying the first score to the candidate attendee via a user interface; and
   requesting user input accepting or rejecting the recommendation.

14. The medium of claim 1, wherein recommending the first reoccurring event for the candidate attendee comprises transmitting a message to the candidate attendee comprising the recommendation.

15. The medium of claim 1, wherein recommending the first reoccurring event for the candidate attendee comprises:
   transmitting a message to an administrator comprising recommendation of the first reoccurring event;
   receiving input, from the administrator, accepting the recommendation; and
   based on the received input, displaying the first reoccurring event to the candidate attendee via a user interface.

16. The medium of claim 1, wherein the operations further comprise identifying the first reoccurring event based on characteristics of the first reoccurring event, wherein the characteristics of the first reoccurring event include one or more of:
   prerequisites for the first reoccurring event;
   availability of the first reoccurring event;
   a plan of study associated with the first reoccurring event; and
   a location corresponding to the first reoccurring event.

17. The medium of claim 1, wherein the operations further comprise:
   identifying a target number of attendees for an event; and
   recommending an event, for the candidate attendee, based on the target number of attendees for the event.

18. The medium of claim 1, wherein:
   the first set of prior attendees had a positive experience with the first reoccurring event, and the second set of prior attendees had a negative experience with the second reoccurring event;
   the positive experience with the first reoccurring event comprises one or more of: enjoying the first reoccurring event, completing the first reoccurring event, receiving a particular score in a task associated with the first reoccurring event, or receiving a particular score in an evaluation metric associated with the first reoccurring event;
   the negative experience with the second reoccurring event comprises one or more of: not enjoying the second reoccurring event, not completing the second reoccurring event, not receiving a particular score in a task associated with the second reoccurring event, or not receiving a particular score in an evaluation metric associated with the second reoccurring event;
   comparing the characteristics of the candidate attendee with the characteristics of the first set of prior attendees comprises one or more of:
      determining whether the candidate attendee has similar characteristics to a first prior attendee, of the first set of prior attendees, that had a positive experience with the first reoccurring event; or
      determining whether the candidate attendee has similar characteristics to a second prior attendee, of the second set of prior attendees, that had a negative experience with the second reoccurring event;
   recommending the first reoccurring event for the candidate attendee comprises recommending a particular time period for the candidate attendee to attend the first reoccurring event based on (a) prior events attended by the candidate attendee or (b) an event schedule for the candidate attendee;
   the first reoccurring event is one of: a first course or a first class;
   the second reoccurring event is one of: a second course or a second class;
   selecting the first course or class is responsive to determining (a) both the candidate attendee and the first set of prior attendees previously attended a second course or class, and (b) the first course or class is associated with a major of the candidate attendee or an interest profile corresponding to the candidate attendee;
   the characteristics of the first set of prior attendees include one or more of: demographic information of each of the first set of prior attendees, behavioral characteristics of each of the first set of prior attendees, and a success rate of each of the first set of prior attendees;
   recommending the first reoccurring event for the candidate attendee comprises:
      transmitting a message to an administrator comprising recommendation of the first reoccurring event;
      receiving input, from the administrator, accepting the recommendation; and
      based on the received input, one or more of:
         displaying the first reoccurring event to the candidate attendee via a user interface, or
         transmitting a message to the candidate attendee comprising the recommendation;
      displaying the first score to the candidate attendee via the user interface; and
      requesting user input accepting or rejecting the recommendation;
   the operations further comprise:
      selecting the first reoccurring event responsive to a threshold number or threshold percentage of event attendees in a prior time period attending the first reoccurring event from a set of available events;
      identifying a target number of attendees for an event;
      recommending an event, for the candidate attendee, based on the target number of attendees for the event; and
      identifying the first reoccurring event based on characteristics of the first reoccurring event, wherein the characteristics of the first reoccurring event include one or more of:
         prerequisites for the first reoccurring event;
         availability of the first reoccurring event;
         a plan of study associated with the first reoccurring event; and
         a location corresponding to the first reoccurring event.

19. A method comprising:
   identifying characteristics of a first set of prior attendees that attended a first reoccurring event;
   comparing characteristics of a candidate attendee with the characteristics of the first set of prior attendees to determine a first score for the first reoccurring event with respect to the candidate attendee;
   responsive to determining that the first score exceeds a first threshold value, recommending the first reoccurring event for the candidate attendee;
   identifying characteristics of a second set of prior attendees that attended a second reoccurring event;
   comparing characteristics of the candidate attendee with the characteristics of the second set of prior attendees to determine a second score for the second reoccurring event with respect to the candidate attendee;

responsive to determining that the second score does not exceed a second threshold value, refraining from recommending the second reoccurring event for the candidate attendee;

wherein the method is performed by at least one device including a hardware processor.

20. A system comprising:

at least one device including a hardware processor;

the system configured to perform operations comprising:

identifying characteristics of a first set of prior attendees that attended a first reoccurring event;

comparing characteristics of a candidate attendee with the characteristics of the first set of prior attendees to determine a first score for the first reoccurring event with respect to the candidate attendee;

responsive to determining that the first score exceeds a first threshold value, recommending the first reoccurring event for the candidate attendee;

identifying characteristics of a second set of prior attendees that attended a second reoccurring event;

comparing characteristics of the candidate attendee with the characteristics of the second set of prior attendees to determine a second score for the second reoccurring event with respect to the candidate attendee;

responsive to determining that the second score does not exceed a second threshold value, refraining from recommending the second reoccurring event for the candidate attendee.

* * * * *

UNITED STATES PATENT AND TRADEMARK OFFICE
CERTIFICATE OF CORRECTION

PATENT NO. : 11,132,612 B2
APPLICATION NO. : 15/933300
DATED : September 28, 2021
INVENTOR(S) : Terra et al.

It is certified that error appears in the above-identified patent and that said Letters Patent is hereby corrected as shown below:

In the Drawings

On sheet 9 of 10, in FIG. 4, and on the title page, the illustrative figure, under Reference Numeral 404, Line 2, delete "a a" and insert -- a --, therefor.

In the Specification

In Column 6, Line 54, delete "10am" and insert -- 10 am --, therefor.

In Column 10, Line 60, delete "SCI 111" and insert -- SCI111 --, therefor.

In Column 10, Line 62, delete "SCI 111" and insert -- SCI111 --, therefor.

In Column 20, Line 23, delete "vale." and insert -- value. --, therefor.

Signed and Sealed this
Third Day of May, 2022

Katherine Kelly Vidal
*Director of the United States Patent and Trademark Office*